United States Patent [19]

Frisch et al.

[11] Patent Number: 4,680,214

[45] Date of Patent: Jul. 14, 1987

[54] REINFORCED FOAM COMPOSITES

[75] Inventors: Kurt C. Frisch, Grosse Ile; Kaneyoshi Ashida, Farmington Hills, both of Mich.

[73] Assignee: Polymetrics Corporation, Monroe, Mich.

[21] Appl. No.: 838,942

[22] Filed: Mar. 12, 1986

[51] Int. Cl.$^4$ ............................................. B05D 5/12
[52] U.S. Cl. ....................................... 428/107; 428/294; 428/297; 428/318.8; 521/51; 521/122; 521/173; 521/175; 521/176
[58] Field of Search ............... 521/173, 175, 176, 122, 521/51; 428/317.9, 318.8, 107, 294, 297

[56] References Cited

U.S. PATENT DOCUMENTS

| | | | |
|---|---|---|---|
| 3,062,682 | 11/1962 | Morgan et al. | 521/122 |
| 3,382,302 | 5/1968 | Marzocchi | 521/122 |
| 3,467,605 | 9/1969 | Abercrombie et al. | 521/173 |
| 3,591,532 | 7/1971 | Abercrombie et al. | 521/173 |
| 3,728,289 | 4/1973 | Reuter et al. | 521/173 |
| 3,856,716 | 12/1974 | Jenkins et al. | 521/173 |
| 4,102,831 | 7/1978 | Osgood | 521/122 |
| 4,163,824 | 8/1979 | Saidla | 428/318.8 |
| 4,544,679 | 10/1985 | Tideswell et al. | 521/173 |

FOREIGN PATENT DOCUMENTS 3113810 10/1982 Fed. Rep. of Germany ... 428/318.8

*Primary Examiner*—Morton Foelak
*Attorney, Agent, or Firm*—Gordon W. Hueschen

[57] ABSTRACT

There is disclosed a polyurethane foam of the rigid type having three different types of polyol components capable of having suspended therein fillers and reinforcing fibers. The foam is made into boards and the like and has continuous fiber glass strands or yarn disposed longitudinally in or adjacent the surface skin of the foam. The strands or yarn are parallel and close together and are flattened out in the foam-forming process so that the surfaces have a continuous fiber glass implant longitudinally and substantially so transversely.

20 Claims, No Drawings

REINFORCED FOAM COMPOSITES

BACKGROUND OF THE INVENTION

Field of the Invention and Prior Art

The invention relates to high-density foam and is particularly directed to rigid polyurethane and isocyanurate-modified polyurethane foam having a density of at least 20 pounds per cubic foot.

Rigid polyurethane and isocyanurate-modified polyurethane foams have been variously described in literature, both in patent and scientific papers by various authors. Almost all of these isocyanate-based foams containing various fillers were primarily produced by two methods, and almost all of them were intended for insulation purposes. See, for example U.S. Pat. Nos. 3,382,302; 4,163,824; and 4,283,563. They have been produced either continuously for low-density (2-3 pcf) thermal insulation (board stock) or by molding of panels. Various equipment has also been designed for that purpose.

However, very little has been disclosed in literature or patents regarding high-density, rigid polyurethane or isocyanurate-modified polyurethane foams designed for structural purposes and having strength properties comparable to wood, although a number of molding methods including reinforced reaction molding (RRIM) have been developed for the production of molded parts, especially for the automotive, furniture and appliance industries.

An object of this invention is the continuous production of high-density foams comprising special types of polyurethane and isocyanurate-modified polyurethane foams, especially in combination with various fillers and reinforcing fibers which are uniquely designed to provide a combination of mechanical strength properties, and environmental (outdoor weathering) properties which make them eminently suitable for applications where wood is normally used for strength and durability. Wood substitutes made of reinforced high-density, fiberglas-reinforced polyurethane foams have heretofore been prepared, for example, a product known as Centrite, and a number of like products described in *Industrial And Engineering Chemistry, Product Research And Development*, Vol. 23, No. 1, (1984) p.p. 81–85, by Klyotaho Morimoto and Toshio Suzuki and in *Proceedings, SPI International Urethane Conference*, Strasbourg, France, June 9–13, 1980, by F. Okagawa et al., p.p. 453–467.

It is an object, therefore, to provide such foams which have not only the advantage of many superior properties, such as much better dimensional stability and greatly improved weathering resistance as well as resistance to biological attack, but which can also be produced continuously in dimensions which are outside of any possibilities as far as wood boards are concerned (aside from the many imperfections in wood because of knots and splits) and to provide foams, the uniqueness of which lies also in the fact that while resembling wood in many respects, because of many physico-mechanical properties similar to wood, they can be used in applications where wood would not be practical or acceptable due to deterioration of the latter on aging.

SUMMARY OF THE INVENTION

The invention relates to a high-density foam formed by foaming agent, with an amount of foaming such that the density is at least twenty pounds per cubic foot, a foam composition comprising:

(A) a foam-forming organic polyisocyanate component having a functionality of greater than two;

(B) a multi-polyol component, constituent polyols of which comprise a rigid polyol having an equivalent weight between about 100 and about 160, a hydroxyl number of about 250 to about 800, and a functionality of at least four; an aromatic polyester polyol (diol or triol) having an equivalent weight between about 100 and about 400, a hydroxyl number of about 150 to about 600, and a functionality of 2 to 3; and a flexible polyol having an equivalent weight between about 1000 and about 2500, a hydroxyl number between about 25 and 60, and a functionality of not greater than three;

said constituent polyols being in the proportions of about 50 to about 75 parts rigid polyol, about 20 to about 50 parts aromatic polyester polyol, and about 1 to about 20 parts flexible polyol in a total amount of 100 parts;

(C) a catalyst selected from the group consisting of urethane catalysts, trimerization catalysts, and mixtures thereof; said urethane catalyst being an essential component when the isocyanate index is between about 100 and about 115 and said trimerization catalyst being an essential component when the isocyanate index is between about 125 and about 500; and the isocyanate component (A) and the polyol component (B) being in proportions which give an isocyanate index between about 100 and about 500; and (D) a surfactant suitable for use in urethane foams;

said constituent polyols being compatible so that the admixture thereof is substantially homogeneous at the foaming temperature and has a consistency such that fillers and reinforcing fibers can be suspended therein in an amount of about 10 to about 50 percent based on the total weight of the composition.

The invention also comprises one or more further features wherein the rigid polyol comprises a poly(oxypropylene) or a poly(oxypropylene) poly(oxyethylene) adduct of a polyhydroxy compound having at least four reactive hydroxyl groups; wherein the aromatic polyester polyol comprises a hydroxyl-terminated terephthalate ester; wherein the flexible polyol comprises a poly(oxyalkylene) adduct of a lower aliphatic triol having not more than six carbon atoms; wherein the organic polyisocyanate comprises poly(isocyanatophenylmethylene) phenylisocyanate (PMDI) having a functionality of about 2.2 to about 3; wherein the catalyst comprises both a urethane catalyst and a trimerization catalyst and the isocyanate index is between about 125 and about 200; wherein the density of the foam is between about 25 and about 45 pounds per cubic foot; and wherein the rigid polyol is a sucrose-based adduct.

The invention also comprises high-density foams according to the above wherein the composition contains, based on the total weight of the composition, about 10 to about 30 percent of one or more mineral fillers; in which the mineral fillers comprise wollastonite and trishydrated alumina; wherein the composition contains, based on the total weight of the composition, about 10 to about 30 percent of reinforcing glass fibers; wherein the reinforcing glass fibers comprise chopped or milled fiber glass; in which the foam is in an elongate form containing continuous fiber glass strands or yarn longitudinally-disposed therein; wherein the elongate form has a skin on each of longitudinally-disposed, parallel surfaces and contains longitudinally-disposed, parallel fiber glass strands or yarn in or adjacent said skin surfaces and spaced closely together across the width thereof; wherein the foam is in an elongate form having a skin on each of longitudinally-disposed, parallel surfaces and contains longitudinally-disposed, parallel fiber glass strands or yarn in or adjacent said skin surfaces and spaced closely together across the width thereof, and wherein the fiber glass strands or yarn are flattened in side-by-side relation in which the fiber glass of said continuous strands or yarn is in close proximity or near contact.

Such "flattening" of fiberglass yarn or strands in side-by-side relation is in fact old in the art. By way of explanation, it should be pointed out that, first of all, continuous glass strands are generally "bundled" together by either of two different methods, the products of which are called either "assembled strands" or "direct strands" (or "direct rowings"). The "assembled" strands are more ovate than circular, but are loosely described by their diameter. The "direct" strands are generally of a more flattened nature, where the width of the strand is the predominant measurement. The producers of "direct strands" refer to them as "zero catenary" strands, which means that they are free of loops or uneven lengths, this being claimed by their producers to be an advantage. Representative samples are P965 by Owens-Corning and R099 by CertainTeed. The last three numbers in each of the product identification codes are variable to designate the pounds of glass used in making up the strand. The pounds of glass used dictate the cost. For example, P965AA113 indicates that a pound of glass yields 113 yards of strands per bundle, whereas R099250 indicates that a pound of glass yields 250 yards of strands per bundle. The R099 CertainTeed product is referred to as a "direct" or zero caternary roving, whereas the Owens-Corning product is referred to as an "assembled" roving. For purposes of the present invention, either type of continuous glass fiber may be further "flattened" according to the skill of the art by one or more commonly-available procedures employing commonly-available equipment. For example, the so-called "Pultrusion" procedure may be employed, whereby glass strands are flattened in side-by-side relationship by a pair of rollers, usually as the glass strands leave a wet-out tank wherein they may be wetted out with an appropriate resin. Another commonly-employed procedures has its origin in filament winding, and involves procedure wherein the fiberglass strands are flattened by running over a fixed rod. Either of these procedures, or others known in the art, may be employed to flatten the fiberglass strands in side-by-side relationship whereby the continuous filaments, strands, yarn, or rovings come into close proximity or near contact with each other.

The invention particularly comprises a high-density foam formed from the foam-forming components specifically given above wherein the composition contains, based on the total weight of the composition, about 10 to about 25 percent of one or more mineral fillers; wherein the composition contains, based on the total weight of the composition, about 10 to about 30 percent of reinforcing glass fibers; wherein the composition contains, based on the total weight of the composition, about 10 to about 40 percent each of one or more mineral fillers and not more than about 50 percent of mineral fillers and reinforcing glass fibers combined; wherein the foam is in an elongate form having a skin on each of longitudinally-disposed, parallel surfaces and contains longitudinally-disposed, parallel fiber glass strands or yarn in or adjacent said skin surfaces and spaced closely together across the width thereof; wherein the catalyst comprises both a urethane catalyst and a trimerization catalyst and the isocyanate index is between about 125 and about 200; wherein the density of the foam is between about 25 and about 45 pounds per cubic foot; wherein the rigid polyol is a sucrose-based adduct.

The invention also comprises high-density foams according to the above wherein the composition contains, based on the total weight of the composition, about 10 to about 25 percent of one or more mineral fillers; in which the mineral filler comprises wollastonite and trishydrated alumina; wherein the composition contains, based on the total weight of the composition, about 10 to about 30 percent of reinforcing glass fibers; wherein the reinforcing glass fibers comprise chopped or milled fiber glass; in which the foam is in an elongate form containing continuous fiber glass strands or yarn longitudinally-disposed therein; in which the elongate form has a skin on each of longitudinally-disposed, parallel surfaces and contains longitudinally-disposed, parallel fiber glass strands or yarn in or adjacent said skin surfaces and spaced closed together across the width thereof; wherein the foam is in an elongate form having a skin on each of longitudinally-disposed, parallel surfaces and contains longitudinally-disposed, parallel fiber glass strands or yarn in or adjacent said skin surfaces and spaced closely together across the width thereof; and wherein the fiber glass strands or yarn are flattened in side-by-side relation to give surface skins in which the fiber glass of said continuous strands or yarn are in close proximity or near contact.

The invention particularly comprises a high-density foam formed from the foam-forming components specifically given above, wherein the composition contains, based on the total weight of the composition, about 10 to about 40 percent of one or more mineral fillers; wherein the composition contains, based on the total weight of the composition, about 10 to about 40 percent each of one or more mineral fillers and not more than about 50 percent of mineral fillers and reinforcing glass fibers combined; wherein the foam is in an elongate form having a skin on each of longitudinally-disposed, parallel surfaces and contains longitudinally-disposed, parallel fiber glass strands or yarn in or adjacent said skin surfaces and spaced closely together across the width thereof; wherein the catalyst comprises both a urethane catalyst and a trimerization catalyst and the isocyanate index is between about 125 and about 200; wherein the density of the foam is between about 25 and about 45 pounds per cubic foot; and wherein the rigid polyol is a sucrose-based adduct.

GENERAL CONSIDERATIONS

A significant feature of these foam compositions is the density range, which can be varied widely depending upon the foam system, the type and amount of fillers and reinforcing fibers and the respective ratio of (1) resin components and (2) fillers and reinforcing fibers. Preferred densities range from about 25–45 pounds per cubic foot, although both lower and higher foam densities can be achieved.

The major components of the polyurethane foams are polyols and polyisocyanates along with catalysts, surfactants and blowing agents (water, which provides $CO_2$, fluorocarbons, methylene chloride, or other suitable blowing agents). However, it is the unique combination of foam ingredients of this invention which makes them surprisingly adaptable to the production of high-density foams providing compatibility of the components, good flow, and processability.

The major rigid polyol components of the urethane foams are poly(oxypropylene) and poly(oxypropylene) poly(oxyethylene) adducts of polyfunctional polyols having at least four reactive hydroxyl groups such as sucrose, α-methylglucoside, soribtol, glucose, fructose, dextrose, and pentaerythritol.

The flexible polyols are poly(oxyalkylene) adducts of glycerol, trimethylolpropane, and like aliphatic polyols having not more than 6 carbon atoms. These adducts consist generally of ethylene or propylene oxide adducts, although other oxyalkylating agents can be used, either alone or in combination.

By selecting polyols, which are known to form rigid foams, to wit, those having an equivalent weight between about 100 and about 160 and a hydroxyl number of about 250 to about 800 and a functionality of at least 4 and combining them with other polyols, a balance of useful properties from the point of view of mechanical strength properties, as well as for purposes of easily processable viscosities for continuous foam machine operation, can be obtained.

Suitable such other polyols are, on the one hand, those of the above polyols which are known to form flexible foams, to wit, those having an equivalent weight of about 1000 to about 2500, a hydroxyl number of between about 25 and about 60 and a functionality of not more than 3 and, on the other hand, aromatic polyester polyols (diols or polyols) which have an equivalent weight of about 100 to about 400 and a hydroxyl number of about 150 to about 600, and a functionality of 2 to 3, some of which are derived from terephthalate esters or by-products of terephthalates by transesterification with various glycols.

While combinations of polyether polyols with various terephthalate-based polyester polyols have been disclosed in literature, again for low-density urethane or isocyanurate foams, the difficulties regarding compatibility of these components, particularly in conjunction with fluorocarbons, have been emphasized. While a number of compatibilizing agents have been used on this account, in the present invention there is no need for any special compatibilizing agents since the foams of this invention are not low-density products and, hence, do not require any substantial amount of fluorocarbon or none at all, and the aromatic polyester polyols are compatible with the polyether polyols used in the novel compositions of the invention at the proportion levels which are employed.

Thus, one important aspect of this invention is to provide combinations of polyfunctional polyols (which are typically used for rigid urethane foams) with aromatic polyester polyols, such as phthalate, isophthalate, and terephthalate polyester diols, and flexible polyols, such as poly(oxyalkylene) ethers based on aliphatic polyols having not more than 6 carbon atoms, for example, glycerol and trimethylol propane or similar polyols, which have an equivalent weight of about 1000 to about 2500 and a hydroxyl number of about 25 to about 60, and a functionality not greater than 3, as well as poly(oxyalkylene) adducts of aminopolyols, such as triethanolamine, diethanolamine, or ethanolamine. Binary blends tend to give products exhibiting a brittleness and only mediocre nail-holding power, whereas it has not been found that a ternary combination brings about a surprising combination of strength as well as nail-holding power and good flow properties (although this may not necessarily restrict the number of polyol components).

The terms "rigid polyols" and "flexible polyols" are intended to designate those types of polyols which, when used alone, in combination with the isocyanates and/or isocyanurates used in invention, produce respectively rigid and flexible foams.

Suitable polyisocyanates are poly(phenylene) poly(methylene) isocyanate (PMDI or PAPI), also named poly(isocyanatophenylmethylene) phenyliscocyanate, produced by phosgenation of reaction products of aniline with formaldehyde in acid media. The poly(phenylene) poly(methylene) isocyanates are disclosed in U.S. Pat. No. 3,916,060, where they are used in making low-density (2.0 to 2.8 lbs./cu.ft.) semi-rigid foams. The functionality of these polyisocyanates may vary between 2.2 and 3.0.

Polyisocyanates with higher functionality can also be used, although "crude" varieties of MDI are most suitable and present a lower cost picture than other types of aromatic polyisocyanates. These materials also have very low vapor pressure and, hence, are preferable to use for environmental and health reasons.

The ratios of polyisocyanate to polyol, i.e., isocyanate index (NCO/OH×100), can vary depending upon whether one desires to obtain polyurethane or isocyanurate-modified polyurethane foams. Generally, the isocyanate index for urethane foams can vary between about 100 and about 115 while that for isocyanurate-modified foams can be from about 125 to about 500 or even higher. However, in the context of this invention, it is desirable not to have too high an isocyanate index, for example, not more than about 200, in order to avoid brittleness.

Preferentially, the isocyanate index is between about 125 and about 200, which results when a mixture of urethane and trimerization catalysts is used, in an isocyanurate-modified urethane foam.

It is a unique feature of this invention that the above-mentioned combination of polyols reduces the tendency to brittleness, even at higher isocyanate indices.

The catalysts for these foams are urethane or trimerization catalysts or combinations thereof.

Suitable urethane catalysts are triethylenediamine (1,4-diazabicyclo-[2,2,2]-octane, "Dabco", Air Products), Dabco 8020 (20% Dabco in 80% dimethylethanolamine or Dabco 33LV (33% Dabco in 66% dipropylene glycol), Polycat 8 1,3,5-tris(dimethylaminopropyl)hexahydrotriazine, Abbott Labs.) and other tertiary amines or tertiary amine combinations.

In certain cases, small amounts of organometal catalysts such as dibutyltin dilaurate, dibutyltin diacetate, stannous octanoate, and zinc octanoate can be used as urethane catalysts. Combinations of such metal catalysts with tertiary amines frequently produce synergistic catalytic effects in the formation of these foams.

Suitable trimerization catalysts are quaternaryammonium carboxylates such as Dabco TMR, and TMR-;b 2 (Air Products), 1,3,5-tris(dimethylaminopropyl)-hexahydrotriazine (Polycat 41, Abbott Labs), potassium octanoate (Dabco K-15) or acetate, and combinations of tertiary amines with epoxies.

Various blowing agents can be used to achieve a foam density of at least 20 pounds per cubic foot. In general, the density of the foams is inversely proportional to the amount of blowing agent used. Typical blowing agents which can be used in this invention are carbon dioxide (formed as a result of the reaction of isocyanate groups with water), fluorocarbons such as trichlorofluoromethane (F-11) and trichlorotrifluoroethane (F-113), and methylene chloride. Combinations of blowing agents may also be used, such as $CO_2$ and a fluorocarbon or a fluorocarbon and methylene chloride. It is also possible to exclude chemical blowing agents and introduce only dry air or nitrogen into the reaction mixture, or solely to rely upon the water present in the reaction components.

The use of methylene chloride, F-11, and like low-boiling solvents is also beneficial for the formation of smooth surfaces of the resulting foams.

In order to regulate the size and shape of the foam cells, compatible surfactants can be employed as cell regulators. These include non-ionic surfactants, and both silicone and non-silicone-containing surfactants. Preferred silicone-containing surfactants are dimethyl-silicone-poly(oxypropylene) (oxyethylene) copolymers. Typical surfactants which are used advantageously in this invention are DC-193 (Dow Corning), L-5340 (Union Carbide), or similar copolymers. Other types of suitable non-ionic surfactants are block copolymers of poly(oxypropylene) and poly(oxyethylene), e.g., Pluronic polyols (BASF Wyandotte).

Another characteristic feature of this invention is the use of filler materials such as wollastonite, mica, carbon fibers, Aramid ® fibers, metal fibers, or other types of organic or inorganic fibrous materials in various forms. Also, another characteristic feature is the use of reinforcing such as glass fibers, strands, rovings, yarn, or bundles of rovings, especially in the form of continuous glass strands, milled glass fibers, and chopped glass fibers, and combinations thereof. Advantageously, the amount of about 10 to about 40 percent fillers is used and about 10 to 30 percent glass fiber is used, of which the total is from about 10 percent to about 50 percent by weight of the total composition.

A typical combination of glass fibers in these foam composites can be obtained by the continuous feeding of continuous strands or yarn along the upper and lower surfaces of a molding machine as the foam-forming components are fed thereto. The machine is set to produce billets (boards or beams) suitable for use as construction material which, while capable of being substituted for wood, nonetheless have properties which make them useful in situations where wood is not suitable.

The strands or yarn are made up of bundles of monofilaments aggregated together into larger bundles which may be as much as three- to four-sixteenths of an inch in diameter, more or less, and are standard commodities of commerce. The single filaments in the strands are linear whereas those in the yarn are crimped. Thus, the strands do not stretch whereas the yarn does. For most purposes the continuous strands are preferred because better tensile properties, such as flexural strength and flexural modulus, are obtained as a rule.

The continuous strands or yarn are placed close together, almost side by side, but with sufficient space between them so that, when they are flattened out in the processing, or are flattened out when introduced into the molding machine, they are essentially juxtaposed so that the skins which form on the top and bottom of the finished billet contain longitudinally-disposed continuous glass filaments which are transversely in close proximity or in near contact.

In lieu of fiber glass strands or yarn, there may be substituted glass matrices, either woven or felted but, in any case, loosely woven or felted. Prior to the introduction of the foaming component, there may be incorporated therein fillers as described above, inclusive of non-continuous glass fibers, such as milled or chopped glass fibers.

The glass fibers (in whatever form they are used) are preferentially sized with glass fiber-sizings, such as silane, titanate, or like coupling agents, to promote adhesion between the glass and the resin matrix.

The fillers can be similarly tested, for example, wollastonite surface-modified with silane is available commercially as Wollastokup (NYCO).

It is another characteristic feature of this invention that certain other types of fillers and additives are used to effect certain combination properties of these unique foam composites. For example, the addition of alumina trishydrate ($Al_2O_3.3H_2O$), and wollastonite, with or without other inorganic fillers such as fly ash, gypsum, sodium silicates, calcium carbonate, zinc borate, ammonium phosphate, and similar additives, provides a low degree of combustibility and low smoke evolution.

Combinations of various fillers and reinforcing fibers can be used, such as wollastonite, alumina trishydrate and glass fibers to achieve especially good results.

The proportions of the several polyols advantageously is maintained within a relatively narrow range. Thus, it is desirable to use from about 55 to about 75 percent rigid polyols; from about 1 to about 20 percent flexible polyols; and from about 20 to about 60 percent aromatic polyester polyols, based on the total content of polyols.

Organohalogen or organophosphorus-type flame-retardants, such as tris(dichloropropyl)phosphate, tris(chloroethyl)phosphate, dibromoneopentyl glycol, glycol esters or ethers derived from tetrabromo- or tetrachlorophthalic anhydride, as well as other reactive or additive types of flame-retardants containing combinations of P, Cl, Br, and N, can be added to impart flame-resistant properties to the foam composites.

The production of these foams is advantageously carried out by means of a continuous process. It comprises the continuous metering of two components, one being the isocyanate component (Component A) and the other being the resin component (Component B), to a mixing head and the dispensing of the reaction mixture onto the double conveyor belt of a continuous molding machine which is equipped with specially designed adjustable side molding restraints which allow for the production of foams in varying widths and with predetermined edge shapes, such as ship-lap and round or square corners. Simultaneously, with the discharge of the foam components through the mixing head, glass fibers (in various forms) are continuously fed through the foam mix. Optionally, chopped fibers can be dispensed onto the conveyor belt alone or concomitantly with the continuous feeding of glass mat or matrix or glass strands onto the conveyor belt.

Component A (the isocyanate component) advantageously consists essentially of the polyisocyanate (PMDI). Typical materials are Mondur MR (Mobay Chemical Co.), PAPI 27 and 135 (Dow), or other similar materials. A certain amount of surfactant can be added to the polyisocyanate as well as certain fillers, if desired.

Component B (the resin component) consists essentially of the combination of rigid polyols, e.g., Voranol 360 or 490 (sucrose-based polyols, i.e., poly(oxypropylene) poly(oxyethylene) adducts) (Dow Chemical Co.), flexible polyols, and aromatic polyols, e.g., Terate 202 and 203 (terephthalate polyester diols) (Hercules) and Pluracol P-380 or 220 (glycerol or trimethylolpropane based poly(oxypropylene) poly(oxyethylene) adducts (BASF-Wyandotte), and additionally, in various proportions, catalysts (urethane or trimerization catalysts or combinations), surfactant(s), e.g., DC-193 or L-5340 (Dow Corning, Union Carbide), fillers, such as Wollastokup (Nyco), Hydrafill (alumina trishydrate, Great Lakes Mineral), or other fillers, as well as any additional flame-retardant. The amount of fillers and/or fibers in the resin component can vary between about 10 and about 50 percent and may depend upon the viscosity of the resulting mix. As mentioned previously, some fillers can be added to the isocyanate component. It is usually advantageous to keep the resin mix agitated in order to avoid settling of any inorganic fillers.

The resin component is, advantageously, kept between about 30 and about 60° C., although the temperature can be somewhat higher if a lower viscosity is desired.

The height and the width of the continuously-formed foam composites (foam plus fillers and/or fibers) can be varied depending upon the height and width of the double belt conveyor used. A heating zone through which the foam composites are moved is kept preferentially between about 60 and about 80° C. The foam composites are then cut to specified dimensions and stored at room temperature.

The foam composites can be coated with a urethane coating consisting of foam components minus the blowing agents, surfactants, and fillers, or with other suitable urethane or modified urethane coatings, to improve the appearance and for protection against UV light. UV stabilizers and antioxidants can be added to these coating systems. These coatings can be applied directly on the foaming line (conveyor belt) or after the foam composites have come out of the heating zone.

It is also a part of this invention to saturate or wet out the continuous glass strands, prior to introduction to the foam being discharged through the mixing head, with a polymer specially formulated to provide a hard, dense surface on the order of 5 to 50 mil thick, which will result in an extremely durable wear surface, as well as extend the environmental (outdoor weathering) properties. The polymers can be applied by either a dip or spray process and can include the polymers employed for foaming (without foaming agent), acrylates, acrylic modified unsaturated polyesters, and/or aliphatic polyisocyanate modified urethanes, with or without added filler. By controlling the catalysis of the selected polymer, the length of the reaction time can be adjusted to coincide with that of the high density foam as it proceeds through the heated pressure conveyor, resulting in an outer skin composite.

DESCRIPTION OF THE PREFERRED EMBODIMENTS

The invention can be more fully understood by reference to the following examples. The parts and percentages herein are by weight unless otherwise specified.

EXAMPLE 1

A polyol blend was prepared by blending 60 parts of a rigid polyol Voranol 360 (polyether triol, equivalent weight 155, hydroxyl number 359, and hydroxyl functionality of 4–6, Dow Chemical Co.), 10 parts of a flexible polyol, Pluracol 220 (polyether triol equivalent weight 2093, hydroxyl number 27, BASF Wyandotte Corp.) and 30 parts of an aromatic polyether polyol, Terate 202 (equivalent weight 126, hydroxyl number 315, and a hydroxyl functionality of two, Hercules, Inc.).

Into the polyol blend, 1 part of silicone surfactant, DC-193 (Dow Corning Corp.), 0.06 part of urethane catalyst Dabco R-8020 (Air Products), and 0.06 part of urethane catalyst T-12 (dibutyltin dilaurate), and methylene chloride as a blowing agent to give a density of about 39.7 lbs/cu. ft., were blended and then approximately one-half of the filler (54.9 parts trishydrated alumina (Hydrafil) and 27 parts Wollastokup in toto) was added into the blended substance to make Component-I.

Component-II was prepared by blending polymeric isocyanate PAPI 27, equivalent weight 133.3 (Dow) and the remainder of the filler. Isocyanate Index 110.

The components I and II were weighed separately, mixed, and about 5 percent by weight of one-half inch long chopped glass was added and stirred for about 25 seconds, and then charged into a mold and heated at 70° C. for 5 minutes.

The composite has its two opposed main surface layers reinforced by continuous glass fiber strands arranged longitudinally. The content of continuous glass fiber strand in the composite was ten percent, based on the total weight. The glass fiber strands employed were an Owens Corning Fiberglas Corporation product, article number 965-AA113. This product is made up of glass fiber strands (small bundles of monofilaments) bundled together to form a large bundle of about three-sixteenths of an inch in diameter and these strands were kept at one-fourth inch intervals center to center, just beneath both surfaces. In such cases, when different properties are required, the centers can be one-half to three-eighths inch apart.

The foam as it came out of the mold had a thickness of 1.25 inches and a width of three inches and was cut into ten inch lengths. The resulting product was suitable for use as a material of construction in lieu of wood but with improved resistance to weathering and chemicals.

EXAMPLE 2

The procedure of Example 1 was followed using the same materials and the same proportions. The glass strands were completely wet out (saturated) with the same resin polymer as used for the foam without filler or blowing agent, and five percent by weight of OCF Type 832 chopped strand glass one-half inch long was added. The foam was $1\frac{1}{4} \times 3 \times 10$ inches. The results of testing are given in the following table:

TABLE I

| PROPERTY | UNIT | EXAMPLE 2 (1) | DRY LAMINATED HARDWOOD (1) (2) | CENTRITE (3) | SEKISUI NEO LUMBER (3) |
|---|---|---|---|---|---|
| Flexural Strength | PSI | 9820 | 8700 | 5000 | 7100 |
| Flexural Modulus | PSI | 535650 | 712783 | 400000 | 710000 |
| Compressive Strength | PSI | 1600 | 2533 | | |
| Compressive Modulus | PSI | 27870 | 47420 | | |
| Density | PCF | 39.7 | 46.4 | 48.3 | 32 |
| (Specific Gravity) | | .64 | .74 | .77 | .50 |
| STRENGTH TO WEIGHT RATIO | | | | | |
| Flexural Strength / Specific Gravity | | 15340 | 11756 | 6493 | 14200 |

(1) Certified Test Data-Independent Testing Laboratory. Specimen size 1¼ × 3 × 10". (Average of three samples)
(2) Values should be reduced from one-fifth to one-third when material is used where the laminate is occasionally wet. See American Society for Testing Materials Specification D245-33.
(3) From Manufacturer's published data.

EXAMPLES 3-6

The procedure of EXAMPLE 1 was repeated using materials and proportions given in Table II, which follows. The Dabco K-15 is a trimerization catalyst supplied by Air Products and the amounts and proportions of the fillers are varied from example to example.

TABLE II
ISOCYANURATE MODIFIED POLYURETHANE FOAMS

| FORMULA-Parts by weight | EXAMPLES 3 | 4 | 5 | 6 |
|---|---|---|---|---|
| Voranol 360 | 60 | 60 | 60 | 60 |
| Terate 202 | 20 | 20 | 20 | 20 |
| Pluracol P-220 | 20 | 20 | 20 | 20 |
| Silicone DC-193 | 1.0 | 1.0 | 1.0 | 1.0 |
| Dabco K-15 | 0.5 | 0.5 | 0.5 | 0.5 |
| M&T T-12 | 0.1 | 0.1 | 0.1 | 0.1 |
| Dabco R-8020 | 0.5 | 0.5 | 0.5 | 0.5 |
| PAPI 27 | 85 | 102 | 119 | 136 |
| NCO/OH Eq. Ratio | 1.25 | 1.5 | 1.75 | 2.0 |
| Isocyanate Index | 125 | 150 | 175 | 200 |
| Trishydrated Alumina parts per weight | 30 | 30 | 30 | 30 |
| Wollastonite parts per weight | 16 | 20 | 25 | 30 |
| Fillers-percent of total weight | 20 | 20 | 20 | 20 |
| Reinforcement percent of total weight Glass - (Chopped and continuous strands | 10 | 10 | 10 | 10 |

The properties are given in the following table:

TABLE III

| PROPERTIES* | EXAMPLES 3 | 4 | 5 | 6 |
|---|---|---|---|---|
| Density PCF | 38 | 37 | 37 | 36.7 |
| Flexural Strength-PSI | 10280 | 11300 | 13200 | 12600 |
| Flexural Modulus-PSI | 576300 | 536000 | 550000 | 562000 |
| Compressive Strength-PSI | 1860 | 1490 | 1900 | 2020 |
| Compressive Modulus-PSI | 28000 | 28300 | 28760 | 30200 |

*Test specimen size 1¼ × 3 × 10"

The products of these examples are a little stiffer and have better flexural strength.

EXAMPLES 7-10

The procedure of EXAMPLE 1 was repeated except that 0.5 parts of Dabco K-15 (a trimerization catalyst) was added and the amounts and proportions of the fillers were varied from example to example, as shown in TABLE IV, which follows.

TABLE IV
THREE-COMPONENT POLYURETHANE FOAMS

| FORMULA-Parts by weight | EXAMPLES 7 | 8 | 9 | 10 |
|---|---|---|---|---|
| Voranol 360 | 60 | 60 | 60 | 60 |
| Terate 202 | 30 | 30 | 30 | 30 |
| Pluracol P-220 | 10 | 10 | 10 | 10 |
| Silicone DC-193 | 1.0 | 1.0 | 1.0 | 1.0 |
| Dabco K-15 | 0.5 | 0.5 | 0.5 | 0.5 |
| M&T T-12 | 0.04 | 0.04 | 0.04 | 0.04 |
| Dabco R-8020 | 0.3 | 0.3 | 0.3 | 0.3 |
| PAPI 27 | 78.6 | 78.6 | 78.6 | 78.6 |
| Isocyanate Index | 110 | 110 | 110 | 110 |
| Trishydrated Alumina parts per weight | 13 | 30 | 50 | 70 |
| Wollastonite parts per weight | 7 | 15 | 27 | 50 |
| Fillers - percent of total weight | 10 | 20 | 30 | 40 |
| Reinforcement- percent of total weight Glass - (Chopped and continuous strands) | 10 | 15 | 15 | 15 |

The properties are given in the following Table V:

TABLE V

| PROPERTIES* | EXAMPLES 7 | 8 | 9 | 10 |
|---|---|---|---|---|
| Density PCF | 35 | 37 | 38 | 38.6 |
| Flexural Strength-PSI | 12200 | 12800 | 13200 | 12600 |
| Flexural Modulus-PSI | 420000 | 510000 | 586000 | 610000 |
| Compressive Strength-PSI | 1530 | 1700 | 1910 | 2030 |
| Compressive Modulus-PSI | 25680 | 27900 | 32050 | 34100 |

*Test specimen size 1¼ × 3 × 10"

It is to be understood that the invention is not to be limited to the exact details of operation or exact compounds, compositions, methods, or procedures shown and described, as various modifications and equivalents will be apparent to one skilled in the art.

We claim:
1. A high-density foam formed by foaming with an amount of foaming agent such that the density is at least twenty pounds per cubic foot, a foam composition comprising:
   (A) a foam-forming organic polyisocyanate component having a functionality of greater than two;
   (B) a multi-polyol component, constituent polyols of which comprise a rigid polyol having an equivalent weight between about 100 and about 160, a hydroxyl number of about 250 to about 800, and a functionality of at least four; an aromatic polyester polyol having an equivalent weight between about

100 and about 400, a hydroxyl number of about 150 to about 600, and a functionality of 2 to 3; and a flexible polyol having an equivalent weight between about 1000 and about 2500, a hydroxyl number between about 25 and 60, and a functionality of not greater than three;

said constituent polyols being in the proportions of about 50 to about 75 parts rigid polyol, about 20 to about 50 parts aromatic polyester polyol, and about 1 to about 20 parts flexible polyol in a total amount of 100 parts;

(C) a catalyst selected from the group consisting of urethane catalysts, trimerization catalysts, and mixtures thereof; said urethane catalyst being an essential component when the isocyanate index is between about 100 and about 115 and said trimerization catalyst being an essential component when the isocyanate index is between about 125 and about 500; and the isocyanate component (A) and the polyol component (B) being in proportions which give an isocyanate index between about 100 and about 500; and (D) a surfactant suitable for use in urethane foams;

said constituent polyols being compatible so that the admixture thereof is substantially homogeneous at the foaming temperature and has a consistency such that fillers and reinforcing fibers can be suspended therein in an amount of about 10 to about 50 percent based on the total weight of the composition.

2. A high-density foam of claim 1 wherein the rigid polyol comprises a poly(oxypropylene) or a poly(oxypropylene) poly(oxyethylene) adduct of a polyhydroxy compound having at least four reactive hydroxyl groups; the aromatic polyester polyol comprises a hydroxyl-terminated terephthalate ester; and the flexible polyol comprises a poly(oxyalkylene) adduct of a lower aliphatic triol having not more than six carbon atoms.

3. A high-density foam of claim 2 wherein the organic polyisocyanate comprises poly(isocyanatophenylmethylene) phenylisocyanate (PMDI) having a functionality of about 2.2 to about 3.

4. A high-density foam of claim 3 wherein the rigid polyol is a sucrose-based adduct.

5. A high-density foam of claim 1 wherein the composition contains, based on the total weight of the composition, about 10 to 40 percent of one or more mineral fillers.

6. A high-density foam of claim 1 wherein the composition contains, based on the total weight of the composition, about 10 to about 30 percent of reinforcing glass fibers.

7. A high-density foam of claim 5 wherein the composition contains, based on the total weight of the composition, about 10 to about 30 percent of reinforcing glass fibers.

8. A high-density foam of claim 7 wherein the composition contains, based on the total weight of the composition, about 10 to about 40 percent each of one or more mineral fillers and not more than about 50 percent of mineral fillers and reinforcing glass fibers combined.

9. A high-density foam of claim 5 in which the mineral filler comprises wollastonite and trishydrated alumina.

10. A high-density foam of claim 8 in which the mineral filler comprises wollastonite and trishydrated alumina.

11. A high-density foam of claim 6 in which the reinforcing glass fibers comprise chopped or milled fiber glass.

12. A high-density foam of claim 1 in which the foam is in an elongate form containing continuous fiber glass strands or yarn longitudinally-disposed therein.

13. A high-density foam of claim 7 wherein the foam is in an elongate form containing continuous fiber glass strands or yarn longitudinally-disposed therein.

14. A high-density foam of claim 12 wherein the elongate form has a skin on each of longitudinally-disposed, parallel surfaces and contains longitudinally-disposed parallel fiber glass strands or yarn in or adjacent said skin surfaces and spaced closely together across the width thereof.

15. A high-density foam of claim 8 wherein the foam is in an elongate form having a skin on each of longitudinally-disposed, parallel surfaces and contains longitudinally-disposed, parallel fiber glass strands or yarn in or adjacent said skin surfaces and spaced closely together across the width thereof.

16. A high-density foam of claim 14 wherein the fiber glass strands of yarn are flattened in side-by-side relation to give surface skins in which the fiber glass continuous strands or yarn are in close proximity or near contact.

17. A high-density foam of claim 15 wherein the fiber glass strands or yarn are flattened in side-by-side relation to give surface skins in which the fiber glass of said continuous strands or yarn are in close proximity or near contact.

18. A high-density foam of claim 15 wherein the density of the foam is between about 25 and about 45 pounds per cubic foot.

19. A high-density foam of claim 18 wherein the catalyst comprises both a urethane catalyst and a trimerization catalyst and the isocyanate index is between about 125 and about 200.

20. A high-density foam of claim 19 wherein the rigid polyol is a sucrose-based adduct.

* * * * *

UNITED STATES PATENT AND TRADEMARK OFFICE
CERTIFICATE OF CORRECTION

PATENT NO. : 4,680,214
DATED : July 14, 1987
INVENTOR(S) : Kurt C. Frisch and Kaneyoshi Ashida It is certified that error appears in the above-identified patent and that said Letters Patent is hereby corrected as shown below:

Col. 1, line 68; after "foaming" (first occurrence) delete "agent " and reinsert "agent " after "foaming" (second occurrence)

Col. 3, line 20; "rowings" should read -- rovings --

Col. 4, line 41; delete "about" (second occurrence)

Col. 6, line 65; delete ";b"

Col. 9, line 17; "Hydrafill" should read -- Hydrafil --

Col. 10, line 14; "triol equivalent" should read -- triol, equivalent --

Col. 13, line 47; "10 to 40" should read -- 10 to about 40 --

Signed and Sealed this

Second Day of February, 1988

*Attest:*

DONALD J. QUIGG

*Attesting Officer*      *Commissioner of Patents and Trademarks*

UNITED STATES PATENT AND TRADEMARK OFFICE
CERTIFICATE OF CORRECTION

PATENT NO. : 4,680,214
DATED : July 14, 1987
INVENTOR(S) : Kurt C. Frisch and Kaneyoshi Ashida It is certified that error appears in the above-identified patent and that said Letters Patent is hereby corrected as shown below:

Col. 6, line 2; "not" should read -- now --
Col. 8, line 16; "tested," should read -- treated, --

Signed and Sealed this

Fifth Day of July, 1988

Attest:

DONALD J. QUIGG

Attesting Officer  Commissioner of Patents and Trademarks

UNITED STATES PATENT AND TRADEMARK OFFICE
CERTIFICATE OF CORRECTION

PATENT NO. : 4,680,214
DATED : July 14, 1987
INVENTOR(S) : Kurt C. Frisch and Kaneyoshi Ashida It is certified that error appears in the above-identified patent and that said Letters Patent is hereby corrected as shown below:

Col. 10, line 10 (second line under Example 1);
"polyether triol" should read -- polyether polyol --

Signed and Sealed this

Seventeenth Day of January, 1989

Attest:

DONALD J. QUIGG

*Attesting Officer*  *Commissioner of Patents and Trademarks*